(12) United States Patent
Van De Sluis et al.

(10) Patent No.: US 9,904,825 B2
(45) Date of Patent: Feb. 27, 2018

(54) CODED LIGHT DEVICE, AND A PRODUCT INFORMATION SYSTEM COMPRISING SUCH A CODED LIGHT DEVICE

(71) Applicant: PHILIPS LIGHTING HOLDING B.V., Eindhoven (NL)

(72) Inventors: Bartel Marinus Van De Sluis, Eindhoven (NL); Philip Steven Newton, Waalre (NL); Dirk Valentinus René Engelen, Heusden-Zolder (BE); Tatiana Aleksandrovna Lashina, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/785,362

(22) PCT Filed: Apr. 15, 2014

(86) PCT No.: PCT/EP2014/057558
§ 371 (c)(1),
(2) Date: Oct. 19, 2015

(87) PCT Pub. No.: WO2014/170290
PCT Pub. Date: Oct. 23, 2014

(65) Prior Publication Data
US 2016/0098584 A1    Apr. 7, 2016

(30) Foreign Application Priority Data

Apr. 19, 2013 (EP) .................................. 13164395

(51) Int. Cl.
*G06K 7/10* (2006.01)
*G06Q 30/02* (2012.01)
(Continued)

(52) U.S. Cl.
CPC ....... *G06K 7/10366* (2013.01); *G06K 7/1097* (2013.01); *G06Q 30/0281* (2013.01);
(Continued)

(58) Field of Classification Search
CPC ............ G06K 19/067; G06K 19/0723; G06K 7/10316; G06K 7/10326; G07K 7/10; G07K 7/10366; G07K 7/1097
(Continued)

(56) References Cited

U.S. PATENT DOCUMENTS 8,248,467 B1    8/2012 Ganick et al.
8,600,854 B2 *  12/2013 Mayr ..................... G06Q 30/02
                                              705/1.1
(Continued)

FOREIGN PATENT DOCUMENTS

WO    2004055686 A2    7/2004
WO    2010116299 A1    10/2010
WO    2012012468 A1    1/2012

OTHER PUBLICATIONS

Raskar, R., et al., "RFIG Lamps: Interacting with a Self-Describing World via Photosensing Wireless Tags and Projectors," ACM Transactions on Graphics (TOG) ACM, 2004 (10 pages).

*Primary Examiner* — Carlos E Garcia
(74) *Attorney, Agent, or Firm* — Meenakshy Chakravorty

(57) ABSTRACT

A coded light device comprising a light source configured to emit coded light, an identifier detection unit configured to detect a product identifier, and a processing unit having a code generator configured to generate a product-related code on basis of the product identifier, and a light source controller configured to control the light source to emit the product-related code by coding its light output.

19 Claims, 2 Drawing Sheets

(51) Int. Cl.
*H04B 10/116* (2013.01)
*H05B 37/02* (2006.01)

(52) U.S. Cl.
CPC ......... *H04B 10/116* (2013.01); *H05B 37/029* (2013.01); *H05B 37/0272* (2013.01)

(58) Field of Classification Search
USPC .................................. 340/10.3, 10.4, 10.42
See application file for complete search history.

(56) References Cited

U.S. PATENT DOCUMENTS

| | | | | |
|---|---|---|---|---|
| 8,884,744 B2* | 11/2014 | Bellows | ............... | G06K 7/0008 235/385 |
| 9,319,756 B2* | 4/2016 | Zimmerman | ............ | H04Q 9/00 |
| 2006/0127097 A1* | 6/2006 | Obrea | ................ | G06K 7/10336 398/115 |
| 2006/0290472 A1* | 12/2006 | Onderko | ............. | G06K 7/0008 340/10.1 |
| 2008/0042839 A1* | 2/2008 | Grater | ............. | G01N 35/00732 340/572.1 |
| 2008/0237339 A1* | 10/2008 | Stawar | .................. | B62B 3/1408 235/383 |
| 2008/0297323 A1* | 12/2008 | Barkan | .................. | G08C 23/04 340/10.31 |
| 2008/0308630 A1* | 12/2008 | Bhogal | .................. | G06Q 30/02 235/383 |
| 2009/0196613 A1* | 8/2009 | Linnartz | ................ | H04B 10/11 398/78 |
| 2010/0225484 A1* | 9/2010 | Van De Sluis | ........... | G01S 1/70 340/572.4 |
| 2010/0322635 A1 | 12/2010 | Klinghult | | |
| 2011/0096764 A1 | 4/2011 | Tunioli et al. | | |
| 2012/0187184 A1 | 7/2012 | Challa et al. | | |
| 2013/0141241 A1* | 6/2013 | Chen | .................. | G06K 7/10316 340/572.1 |
| 2014/0118113 A1* | 5/2014 | Kaushik | ................ | H04W 12/12 340/8.1 |
| 2014/0336920 A1* | 11/2014 | Burrell | ................ | G01C 21/206 701/409 |
| 2014/0350715 A1* | 11/2014 | Gopalakrishnan | ... | G06Q 10/087 700/215 |
| 2016/0092704 A1* | 3/2016 | Russell | ............... | F21V 23/0471 340/10.3 |

* cited by examiner

CODED LIGHT DEVICE, AND A PRODUCT INFORMATION SYSTEM COMPRISING SUCH A CODED LIGHT DEVICE

CROSS-REFERENCE TO PRIOR APPLICATIONS

This application is the U.S. National Phase application under 35 U.S.C. § 371 of International Application No. PCT/EP2014/057558, filed on Apr. 15, 2014, which claims the benefit of European Patent Application No. EP 13164395.9, filed on Apr. 19, 2013. These applications are hereby incorporated by reference herein.

FIELD OF THE INVENTION

The present invention relates to a coded light device comprising a light source configured to emit coded light.

BACKGROUND OF THE INVENTION

Shoppers want offline shopping in real shops to optimally complement their online shopping activities. More and more online shopping happens on mobile devices such as Smart-phones and tablets. Shoppers also increasingly use their Smart phones to assist them during shopping in real stores, for instance, by making photos to keep track of the products they like, to share the products with friends via social networks or to search for additional product information. It is also known that many people are going to shops to browse and explore different products, after which they finally decide on the best option and then buy this product online. This area of "multi-channel retailing" is gaining a lot of attention in the current retail business and retail organizations are looking for new ways to create synergy between the online and offline retail channels, for instance, by bringing the possibilities of online shopping to their stores or by finding new ways to somehow remain connected with shoppers who have visited the store.

More and more products will be RFID tagged in the future in order to support logistic processes for manufacturers and retailers, and shoppers will have Smartphones that may be equipped with NFC chips which are able to read those RFID tags. However, those generic product ID tags are not associated with any retailer- or shop-specific information, so these tags alone do not directly help a retailer in creating a multi-channel approach or in establishing a relation with a shopper that shows clear interest in a particular product. Next to this, there is also uncertainty about how widespread mobile phones with NFC chips will become. On the other hand, the majority of mobile phones nowadays are equipped with a camera, even the more basic ones.

Existing camera based solutions rely on identification through a QR code. A disadvantage of QR codes is that the user has to accurately aim and hold the camera at the code. Correct recognition of the QR code varies quite widely amongst smart phones.

U.S. Pat. No. 8,248,467 discloses a system for using light sources emitting coded light to transmit information to a smart phone, which captures the light. The information comprises an identification code that is used to identify the position of the light source within a building. The system is primarily used for providing a visitor of a museum with position related information, such as information about objects of the exhibition.

It would be advantageous to apply the technique of transmitting information via coded light to the environment of a store, where the customer can receive information about different products by means of coded light transmission. However, in a store the number of products is large, they frequently change position, or are replaced by other products. There is no teaching in U.S. Pat. No. 8,248,467 about how to handle such an environment.

SUMMARY OF THE INVENTION

It would be advantageous to obtain a system for providing a mobile device, such as a smart phone, with information related to a product by means of a coded light emitter and without having to scan a bar code or the like on the product with the mobile device. To better address this concern, in a first aspect of the invention there is presented a coded light device comprising a light source configured to emit coded light, an identifier detection unit configured to detect a product identifier, a processing unit having a code generator configured to generate a product-related code on basis of the product identifier, and a light source controller configured to control the light source to emit the product-related code by coding its light output. By detecting the product identifier and emitting a product-related code by means of the light source, it is possible to provide a mobile device with product-related information by using its standard camera to receive the light. There is no need for the user of the mobile device to scan a particular item, such as a bar code. According to an embodiment of the coded light device, the identifier detection unit comprises a directional antenna. Thereby the likelihood of only detecting the identifier of one product is increased.

According to an embodiment of the coded light device, the directional antenna is a radio frequency identification (RFID) antenna. The use of radio frequency identifier (RFID) elements is increasing and simplifies the detection operation.

According to an embodiment of the coded light device, the identifier detection unit comprises a wireless transmitter, and the processing unit comprises a wireless receiver. Thereby the placement of the identifier direction unit relative to the processing unit is facilitated.

According to an embodiment of the coded light device, the identifier detection unit is configured to be mounted at the light source. Thereby, it is easy to align the beams of the light source and the identifier detection unit with each other.

According to an embodiment of the coded light device, the identifier detection unit is configured to be mounted at the product. Thereby, it is more likely that a single product is identified, and not plural adjacent products, and in the case of using RFID technology it is advantageous to be able to place the identifier detection unit close to the product.

According to an embodiment of the coded light device, the identifier detection unit comprises a light detecting element configured to detect light emitted by the light source. This embodiment has an enhanced capability of selecting a single identifier when detecting several identifiers.

According to another aspect of the invention, there is provided a product information system comprising a coded light device as described above, and a product information source configured to provide information about products.

According to another aspect of the invention, there is provided a method of transmitting information via coded light, comprising:
detecting a product identifier;
generating a product-related code on basis of the product identifier; and controlling a light source to emit the product-related code by coding its light output.

According to another aspect of the invention, there is provided a computer program product comprising executable portions for performing the method.

These and other aspects, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
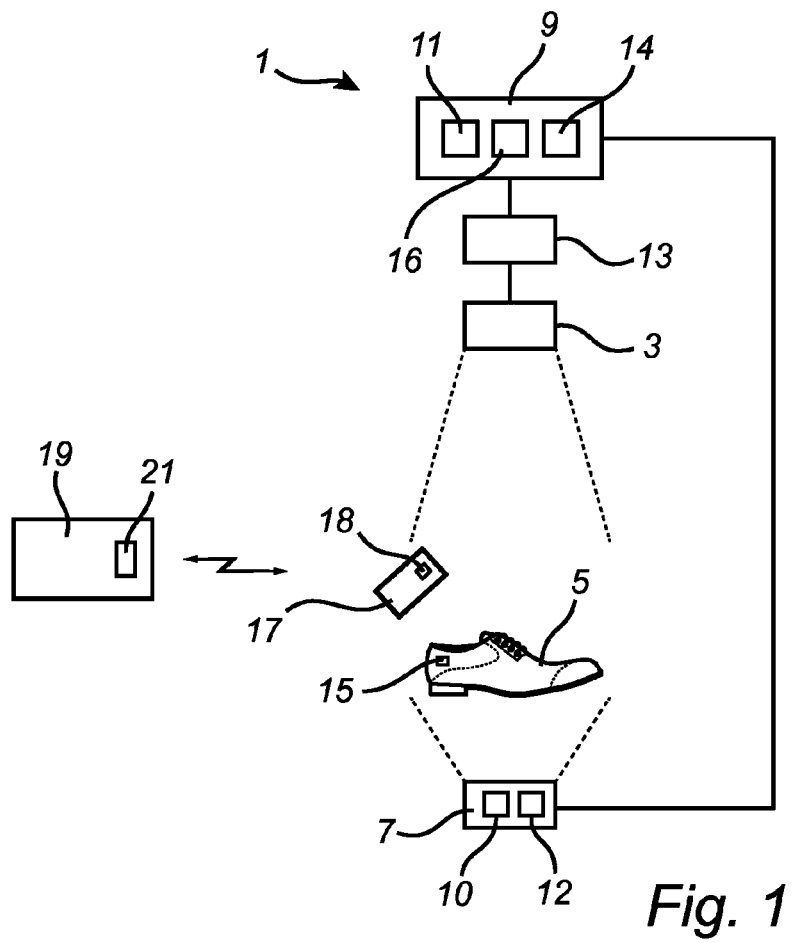
FIG. 1 is a schematic illustration of an embodiment of a coded light device and a product information system according to the present invention.

According to an embodiment of the coded light device 1 it comprises a light source 3, which is configured to emit coded light. The light source 3 is mounted such that it illuminates a product 5, which is for sale. Furthermore, the coded light device 1 comprises an identifier detection unit 7, which is configured to detect a product identifier, e.g. a one-dimensional or two-dimensional (QR) bar code, or an RFID (Radio Frequency Identification) tag, of the product 5. Furthermore, the code light device 1 comprises a processing unit 9, including a code generator 11 configured to generate a product-related code on basis of the product identifier (ID). The processing unit is connected with the identifier connection unit 7. Furthermore, the code light device 1 comprises a light source controller 13, configured to control the light source 3 to emit the product-related code embedded in its light output.

Figure 4:
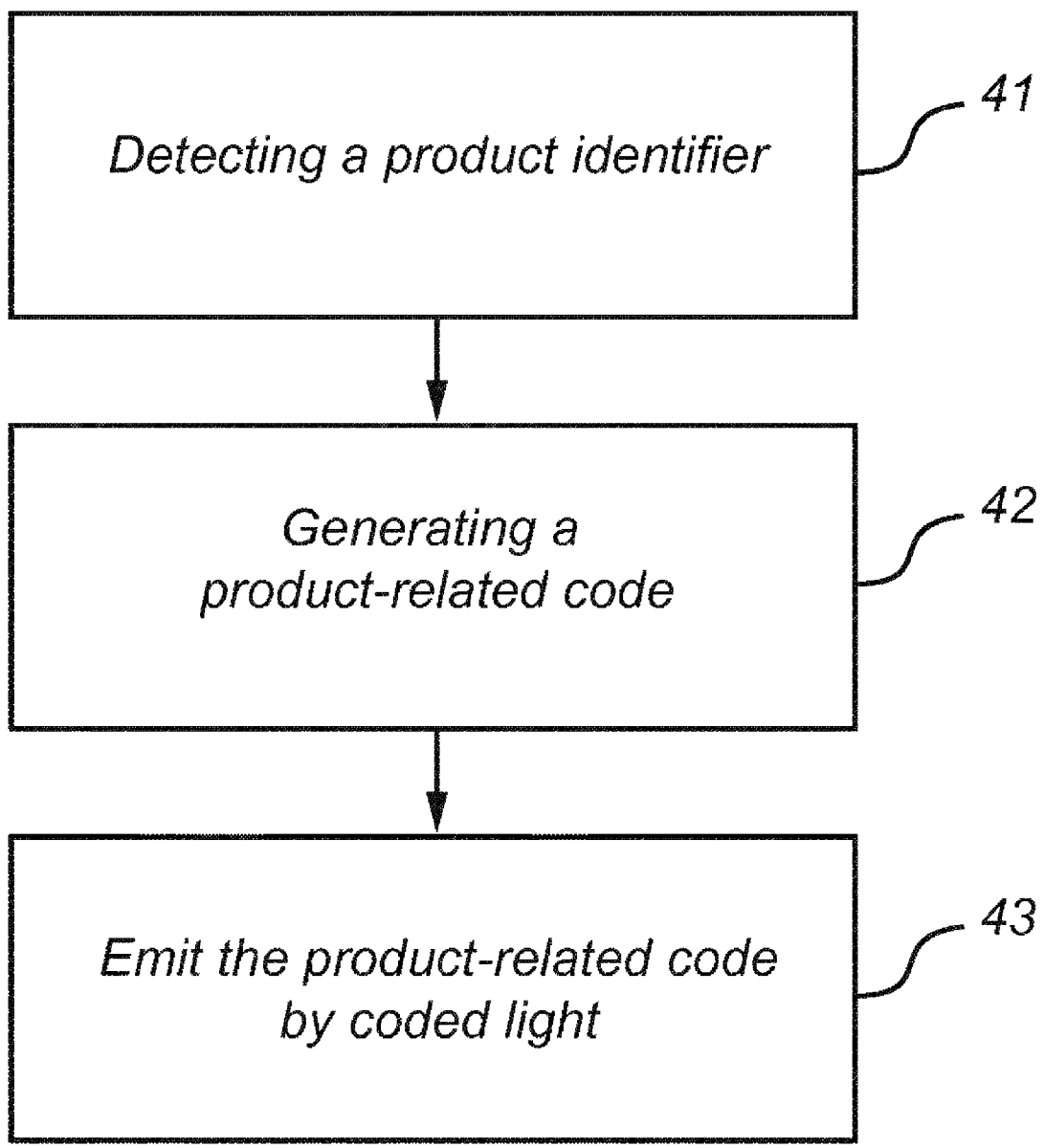
FIG. 4 is a flow chart of an embodiment of a method of transmitting information via coded light.

Briefly, the coded light device 1 is operated as follows, see FIG. 4. First a product identifier is detected, see box 41 in FIG. 4, by means of the identifier detection unit 7, and transmitted to the processing unit 9 via either a wired connection, as shown in FIG. 1, or wirelessly. Then the processing unit 9 generates a product-related code, box 42, on basis of the product identifier. Finally, the processing unit 9 controls the light source 3, by means of the light source controller 13, to emit the product-related code by coding its light output.

The coded light device 1 combined with a product information source 19 constitutes an embodiment of a product information system configured to provide information about the products 5.

Generally, the coded light device 1 is configured to be mounted such that it scans the ID 15 of the product 5 and illuminates the product 5 with light including the product-related code. A customer uses a mobile device 17, such as a smart phone, a tablet, etc., to receive the light by means of a built in camera 18, detects the product-related code, and then receives product related data, on basis of the product-related code, from the product information source 19. The software enabling the Smartphone 17 to gather product-related codes while shopping may either be a generic application (App) for shop assistance, which can be used in multiple stores which have installed the described product information system, or it may be a dedicated App for a particular shop or retail chain.

The light source 3 is for instance a LED unit, the light output of which can be coded by means of several different techniques, such as PWM (Pulse Width Modulation), PPM (Pulse Position Modulation) or PCM (Pulse Code Modulation). Advantageously, the LED unit 3 is provided with a collimating member setting the beam angle of the light output. However, as an alternative to a LED unit any kind of light emitter that can be coded is feasible.

According to this embodiment the identifier detection unit 7 is an RFID antenna, which scans an RFID tag 15 mounted on the product 5. The antenna 7 is directional in order to avoid scanning of RFID tags on neighboring different products, which are not at the present interest of the customer. The antenna 7 has a radiation pattern that is aligned with the location, angle and reach of the light beam produced by the light source 3 enabling a proper detection of ID codes of the RFID-tagged product 5 illuminated by the light source 3. RFID can operate in many frequency bands. The most common version operates in the 900 Mhz band and directional antennas in this frequency range that can pick up an RFID signal at several meters are typically larger, e.g. about 20 by 20 cm, than the LED unit 3. Additionally, the LED unit 3 will typically contain some passive cooling element such as a block of aluminum which will interfere with the antenna signal. Therefore, it is advantageous, as in this embodiment, to have the antenna 7 positioned underneath the product 5.

Figure 2:
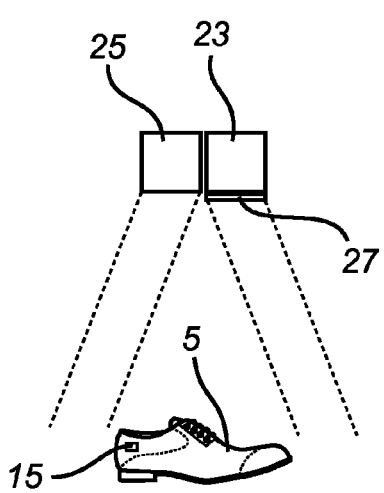
FIG. 2 is a schematic illustration of another embodiment of the coded light device.

However, in some cases this may be cumbersome due to additional installation costs. Therefore, as an alternative, the antenna is placed at the light source. For instance, according to a second embodiment of the coded light device, as shown in FIG. 2, the antenna 23 is placed adjacent to the light source 25, while it can be more distanced from the light source if advantageous for some reason. It is undesired to place the antenna above or underneath the light source, as the light source would then interfere with the RFID signal, or the antenna would be in the way of the light. Still, placing the antenna underneath the object will mean that an antenna with a smaller gain may be used than when placing the antenna next to the light source, which has the advantage that it can be smaller.

In the case that the identifiers of multiple products 5 will be within the detection range of the antenna 7, in spite of the directionality and limited beam width of the antenna 7, the detection is conditioned as follows. A surface of the antenna 7 is covered with a light detecting element 8, and the antenna 7 only responds to products 5 detected at locations where no light is detected from the light source 3. In the second embodiment this requires a more sensitive light detecting element 27, which can detect the coded light being reflected of the product 5.

However, the light detecting element 8, 27 is optional, and anyhow situations may occur where multiple product identifiers 15 are detected by means of the identifier detection unit 7, 23. In this situation the processing unit 9 may either simply send out the related product-related codes in a sequence or choose one of them, e.g. the last product ID being detected. According to an additional option, there is some human intervention in the process supported by a mobile app that is used by the retailer, e.g. a shop manager or a visual merchandiser. After the antenna 7 detects the product ID(s) the app displays the detected product(s). This could be an app that functions similarly to the app the customer would have in the mobile device 17, as described above, however instead used by the retailer. After the app displays the products detected with the RFID antenna 7, the retailer could either confirm the linkage between the generic product ID and the retailer related product-related code, or in the case that product ID was picked up unintentionally the retailer would have means to deselect/remove product ID linkage via the app user interface.

The product-related code for instance represents a product type, a URL, a product name, a promotion code, a coupon, etc. Next to product specific information, additional contextual data may be acquired and stored, such as information about the shop (or shop section) in which the product 5 is being tagged. This may be derived from the geographical location detected by the mobile device 17, or it can be encoded as additional information in the product-related code. In contrast to the product ID, which is typically created and added by the manufacturer, the product-related code can be retailer-specific and may represent or contain a link to extended product information, to an online store, or may represent a coupon or promotion code related to the product. An advantage of product-related codes sent out by a lighting system is that they can be instantly adapted or be dynamic over time. For instance, the product information system can be networked allowing the product-related codes which are sent out for detected product IDs to be controlled from a central headquarter of a retail chain. This enables sending out adjusted product-related codes during temporary promotions enabling dynamic pricing and promotions. Another option, or in combination with some of the above-mentioned structures, the association of the product-related code with the product identifier, which is assumed to be a generic product ID, is simply done by using a look-up table linking the detected product Ids with retailer-specific product-related codes. This association can be performed at different levels, either at the processing unit 8, having a storage 14 holding the look-up table, or at a central controller in the shop, or at a central server at the headquarters of the retail chain, etc.

Once the product-related code has been received at the mobile device 17, product-related information can be presented to the customer on the mobile device 17 or on any other connected information display device either directly, or at a later stage. Typically this will be visual information such as text, images or video, but also auditory information can be envisioned such as spoken language, music or sounds related to the product. The way this is presented may also be dependent on the way the specific user interaction that was used to receive the product-related code.

Thus, the product information source 19 can comprise a database, and can be situated at a server reachable over the Internet, etc. Additionally, the product information source 19 can comprise a wireless transceiver 21 configured for communicating directly with the mobile device 17.

A further alternative for providing the mobile device 17 with the product information is to send it via the coded light. This is possible irrespective of where the very product information source is housed. Presently, there are limits as to what can be transmitted this way, but at least simple graphics and some text can be transmitted, and the technique may be more developed in the future.

Compared to existing solutions that use QR codes to be scanned with the mobile device the ease of use is greatly increased due to the fact that the product-related code is carried in the light captured by the camera 18 of the mobile device 17 and therefore is not dependent on externally controlled ambient light conditions, as they are controlled by the coded light device 1, or camera capabilities. Coded light may be detected by a single pixel or a row of pixels in the camera's ccd and is therefore more robust. Smartphones, typically have advanced light sensing means, such as the camera 18, with image processing means which can be used to decode the modulated light effect, thereby extracting the emitted product-related code. Various user actions from the customer can be envisioned to achieve this, for instance:

a. hold the camera 18 in the beam of the spotlight (to simply pick up and store the product-related code)

b. point the camera 18 towards the product 5 (to directly see product-related info on Smartphone display)

c. point the camera 18 to make a picture of the product (when pointing, the product-related code is detected and linked to the captured image)

One technology required for using a camera as coded-light sensor is a method based on the rolling-shutter image capture that is typical to low-cost image sensors currently used in mobile devices. There are methods for other kinds of cameras as well.

Figure 3:
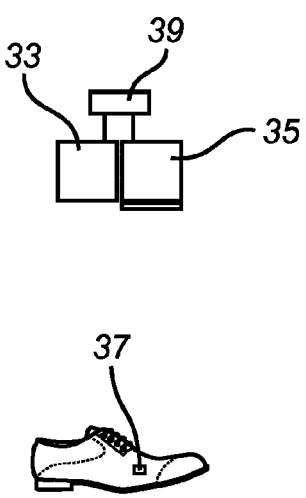
FIG. 3 is a schematic illustration of another embodiment of the coded light device.

According to a third embodiment of the coded light device 31, as illustrated in FIG. 3, the product identifier 37 is a visual code, such as a QR code. The identifier detection unit 35 is an optical detection unit, such as a camera or a scanner, which is arranged at the light source 33. An advantage of using QR codes 37 and co-mount the camera 35 with the light source 33 is that the camera 35 for reading the QR code and the light source can both be regulated by means of the processing unit 39, which thus can adapt the light conditions to the camera properties. This will improve the detectability of the QR code. On the other hand, it is a disadvantage of this embodiment that it requires a free line of sight between the product identifier 37 and the identifier detection unit 35, as well as a proper orientation of the identifier in order to be read by the identifier detection unit 35.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A coded lighting arrangement comprising:
   a coded light device including
      a light source mounted to illuminate a product with coded light emitted by the light source,
      an identifier detection unit configured to detect a product identifier of the product with a radiation pattern of a directional antenna, a processing unit, having a code generator configured to generate a product-related code on basis of the product identifier, and a light source controller configured to control the light source to emit the product-related code by coding light of a light beam output by the light source, wherein the product-related code denotes information identifying the product, wherein the coded light of the light beam including the product-related code illuminates the product, wherein said radiation pattern of the directional antenna is aligned to a location, angle and reach of the light beam output by the light source.

2. The coded lighting arrangement according to claim 1, wherein the directional antenna is a radio frequency identification antenna.

3. The coded lighting arrangement according to claim 1, wherein the identifier detection unit comprises a wireless transmitter, and the processing unit comprises a wireless receiver.

4. The coded lighting arrangement according to claim 1, wherein the identifier detection unit is mounted at the light source.

5. The coded lighting arrangement according to claim 1, wherein the identifier detection unit is mounted at the product.

6. The coded lighting arrangement according to claim 1, wherein the identifier detection unit comprises a light detecting element configured to detect light emitted by the light source.

7. A product information system comprising the coded lighting arrangement according to claim 1, and a product information source configured to provide information about products.

8. A product information system according to claim 7, wherein the product information source is configured to provide information about the product upon reception of the product-related code associated with the product.

9. A product information system according to claim 7, wherein the product information source comprises a wireless transceiver configured for communication with a mobile device.

10. A product information system according to claim 7, wherein the product information source comprises a database, which is accessible over the Internet.

11. The coded lighting arrangement according to claim 1, wherein the light source controller is configured to control the light source to emit the product-related code by coding the light beam output of the light source using a Pulse Width Modulation (PWM) technique, a Pulse Position Modulation (PPM) technique, or a Pulse Code Modulation (PCM) technique.

12. The coded lighting arrangement according to claim 1, wherein the product-related code further denotes information pertaining to a sale of the product.

13. The coded lighting arrangement according to claim 1, wherein the identifier detection unit is configured to detect the product identifier from the product with said radiation pattern.

14. The coded lighting arrangement according to claim 13, further comprising the product.

15. A method of transmitting information via coded light, comprising:

detecting a product identifier of a product with a radiation pattern of a directional antenna;

generating a product-related code on basis of the product identifier; and controlling a light source to emit the product-related code by coding light of a light beam output by the light source, wherein the light source is mounted to illuminate the product with the coded light of the light beam, wherein the coded light of the light beam includes the product related code, wherein the product-related code denotes information identifying the product and wherein said radiation pattern of the directional antenna is aligned to a location, angle and reach of the light beam output by the light source.

16. A computer program product comprising a non-transitory computer readable medium having executable portions for performing the method according to claim 15.

17. The method according to claim 15, wherein controlling the light source comprises controlling the light source to emit the product-related code by coding the light beam output of the light source using a Pulse Width Modulation (PWM) technique, a Pulse Position Modulation (PPM) technique, or a Pulse Code Modulation (PCM) technique.

18. The method according to claim 15, wherein the product-related code further denotes information pertaining to a sale of the product.

19. The method according to claim 15, wherein the detecting comprises detecting the product identifier from the product with said radiation pattern.

* * * * *